(12) United States Patent
Arakawa

(10) Patent No.: US 7,242,968 B2
(45) Date of Patent: Jul. 10, 2007

(54) COMMUNICATION TERMINAL UNIT, CONNECTION CONTROL METHOD AND PROGRAM FOR THE METHOD

(75) Inventor: Takeharu Arakawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 272 days.

(21) Appl. No.: 10/657,100

(22) Filed: Sep. 9, 2003

(65) Prior Publication Data

US 2004/0054462 A1 Mar. 18, 2004

(30) Foreign Application Priority Data

Sep. 13, 2002 (JP) ............................ P2002-268370

(51) Int. Cl.
*H04B 1/38* (2006.01)

(52) U.S. Cl. ................ 455/566; 455/550.1; 455/422.1; 455/73; 455/457; 455/414.1; 455/414.3

(58) Field of Classification Search ................ 455/566, 455/517, 414.1, 550.1, 73, 457, 414.3, 422.1; 701/200, 208, 207, 209, 210
See application file for complete search history.

(56) References Cited

U.S. PATENT DOCUMENTS

| 6,178,377 | B1 * | 1/2001 | Ishihara et al. ............. 701/200 |
| 6,381,637 | B1 * | 4/2002 | Kamada ..................... 709/218 |
| 6,385,542 | B1 * | 5/2002 | Millington .................. 701/213 |
| 6,477,526 | B2 * | 11/2002 | Hayashi et al. ................ 707/4 |
| 6,584,328 | B1 * | 6/2003 | Kung .......................... 455/566 |
| 6,600,994 | B1 * | 7/2003 | Polidi ......................... 701/209 |
| 6,654,683 | B2 * | 11/2003 | Jin et al. .................... 701/207 |
| 6,675,092 | B1 * | 1/2004 | Katayama et al. .......... 701/208 |
| 6,868,335 | B2 * | 3/2005 | Obradovich et al. ........ 701/208 |
| 6,879,285 | B2 * | 4/2005 | Nobukiyo ............... 342/357.09 |
| 2001/0009427 | A1 | 7/2001 | Kaneko et al. |
| 2003/0046355 | A1 * | 3/2003 | Rosenberg et al. ......... 709/206 |

FOREIGN PATENT DOCUMENTS

GB 2 354 128 A 3/2001

* cited by examiner

*Primary Examiner*—Joseph Feild
*Assistant Examiner*—Khai Nguyen
(74) *Attorney, Agent, or Firm*—Sughrue Mion, PLLC

(57) ABSTRACT

In acquiring the information accumulated in the storage unit of the information center by making the connection of the line connecting the communication unit mounted on the vehicle mounted terminal and the center communication unit of the information center, a process for starting the line connection with the information center is started in advance, when the display on the display unit mounted on the vehicle mounted terminal transfers to the predetermined display contents, whereby the information can be transmitted immediately via the line already connected at the time when an actual operation for transmitting the information from the vehicle mounted terminal to the information center is performed.

13 Claims, 2 Drawing Sheets

COMMUNICATION TERMINAL UNIT, CONNECTION CONTROL METHOD AND PROGRAM FOR THE METHOD

CROSS REFERENCE OF RELATED APPLICATION

This application is based on and claims priority under 35 U.S.C. §119 with respect to Japanese Patent Application No. 2002-268370 filed on Sep. 13, 2002, the entire content of which is incorporated herein by reference.

BACKGROUND OF THE INVENTION

1. Field of the Invention

The present invention relates to a communication terminal that is widely employed for a navigation system mounted on a mobile unit.

2. Description of the Related Art

A car navigation system that is mounted on a vehicle that is a typical mobile unit displays a map on a display unit, based on a current location of the vehicle positioned, with a mark indicating the current location of the self vehicle superposed on its map.

In the car navigation system, a positioning unit for positioning the current location of the vehicle comprises a GPS (Global Positioning System) receiver and various self-contained navigation sensors for calculating the current location from the travel distance and the moving direction of the vehicle.

Also, the map information for displaying a map on the display unit, the relevant information associated with the map information and various kinds of functional services are provided from an information center located outside the vehicle, employing a communication unit mounted on the vehicle.

SUMMARY OF THE INVENTION

An object of the invention is to provide a navigation system for acquiring or receiving various kinds of information or various functional services from the provider, employing the communication terminal mounted with the communication unit, which is capable of providing (by display or sound output) the information or proceeding with the operation at excellent responses without making aware of the connection state of the communication unit.

In order to solve the above problems, the present invention provides a communication terminal unit comprising a display unit, a display control unit for displaying the predetermined information on the display unit, a communication unit, and a connection control unit for controlling a connection state of the communication unit with an information center, wherein the communication terminal unit acquires the information from the information center by connecting via the communication unit to the information center, characterized in that the connection control unit starts a connection to the information center when the display on the display unit transfers to the predetermined display contents under the control of the display control unit.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
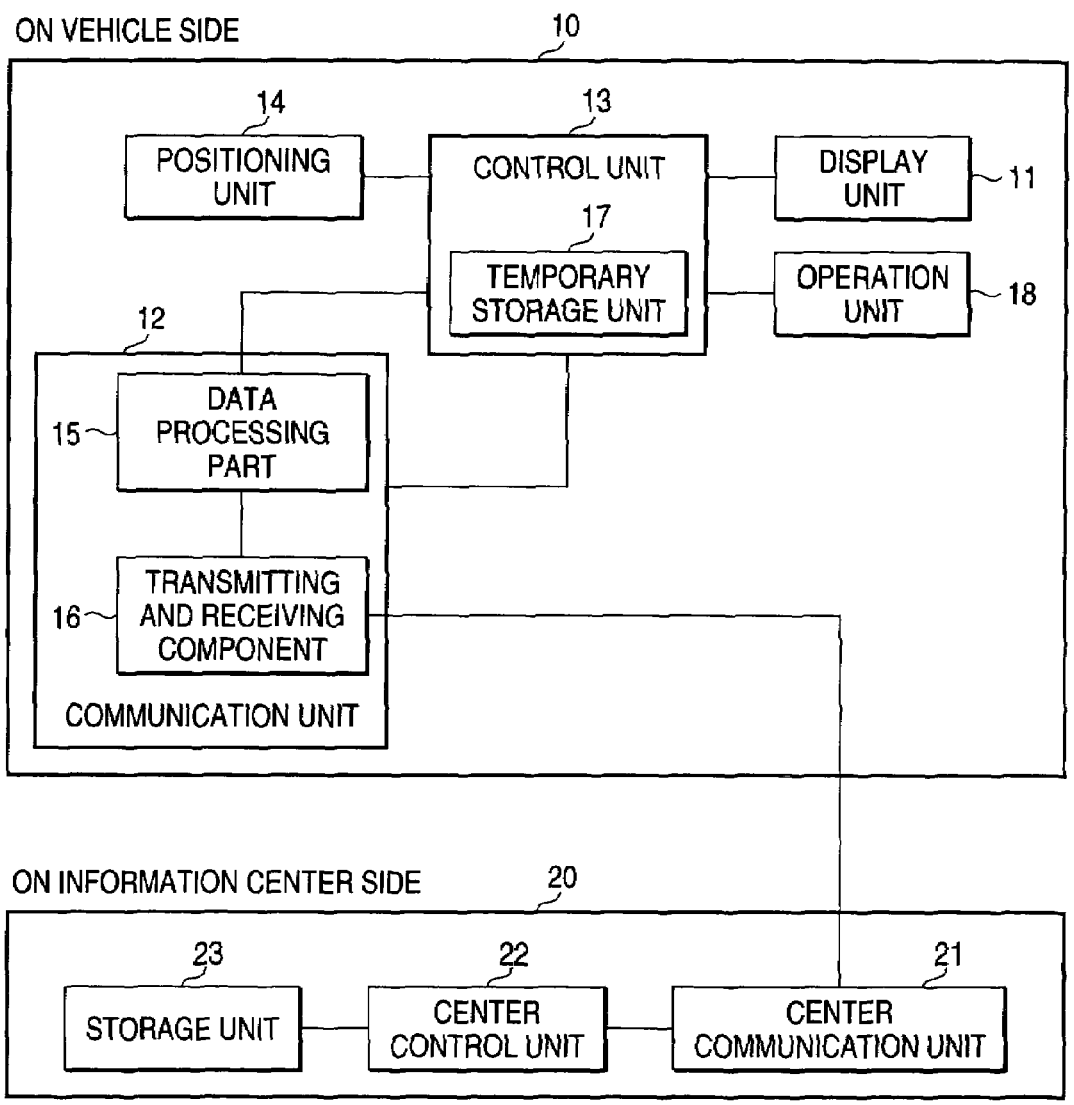
FIG. 1 is a block diagram of the navigation system according to an embodiment of the present invention.

Referring to FIG. 1, an embodiment of the present invention will be described below. This embodiment involves a navigation system employing a communication terminal of the invention.

In FIG. 1, reference numeral 10 denotes a vehicle mounted terminal mounted on the vehicle. The vehicle mounted terminal 10 comprises a display unit 11, a communication unit 12, a control unit 13 that functions as a display control for controlling a display unit 11, and functions as a connection control unit for controlling a communication unit 12, a positioning unit 14 for positioning the current location of the vehicle, and an operation unit 18 for enabling the user to input various kinds of commands. Also, the communication unit 12 comprises a data processing part 15 for processing the data to be transmitted or received, and a transmitting and receiving component 16 for transmitting and receiving the data.

Reference numeral 20 denotes the configuration of an information center. The information center 20 comprises a center communication unit 21 for communicating with a communication unit 12 mounted on the vehicle, a storage unit 23 for storing various kinds of information, and a center control unit 22 that functions as a center communication unit control part for controlling the center communication unit 21 to make the communication, functions as a reading control part for controlling reading various kinds of information from the storage unit 23, and functions as a calculation part for calculating the drive route of the vehicle.

As described above, in the navigation system composed of the vehicle mounted terminal 10 and the information center 20, various kinds of request commands are transmitted from the vehicle mounted terminal 10 to the information center 20 via a communication line connecting the communication unit 12 and the center communication unit 21, and various kinds of information are transmitted from the information center 20 to the vehicle mounted terminal 10 in response to commands.

A portable telephone service system and a PHS telephone service system are available for the line connecting the communication unit 12 and the center communication unit 21. Examples of the request command sent from the vehicle mounted terminal 10 to the information center 20 may include various kinds of information acquisition commands and functional commands, such as a map request command for acquiring the map information, a route calculation request command for calculating the drive route, and a retrieval request command for retrieving a facility or a spot, which are mounted on the conventional navigation system.

Herein, the map request command will be detailed below. The control unit 13 outputs the map request information including the current location information and the map scale information based on the current location of the vehicle positioned by the positioning unit 14 to the data processing part 15. After various kinds of information is converted into a predetermined format in the data processing part 15, the map request command is transmitted via the transmitting and receiving component 16 to the information center 20.

In the information center 20, the center control unit 22 reads out the map information from the storage unit 23 in response to the map request command acquired via the line connecting the communication unit 12 and the center communication unit 21, and transmits the read map information via the line to the vehicle mounted terminal 10.

At the vehicle mounted terminal 10, a map is displayed on the display unit 11, based on the map information acquired via the line by the communication unit 12. The control part 13 comprises a temporary storage unit 17 for storing the information, where by various kinds of information acquired from the information center 20, including the map information, is stored and held, unless they are deleted positively upon an instruction of the user.

The route calculation request command will be detailed below. At the vehicle mounted terminal 10, a plurality of screens for enabling the user to decide the place of departure and the place of destination are switched and displayed in succession on the display unit 11 in accordance with a user's operation under the control of the control unit 13.

When the user operates the operation unit on the display by switching it, the place of departure and the place of destination, with the place of transition, are decided. The control unit 13 outputs the route calculation request command information, including the departure spot information, the destination spot information, the transition spot information and the route calculation condition information to the data processing part 15, based on the information in each district, whereby the route calculation request command information is converted into a predetermined format in the data processing part 15, and transmitted as a route calculation request command via the transmitting and receiving component 16 to the information center 20.

The information center 20 calculates the optical drive route from the map information that the center control unit 22 reads from the storage unit 23, the departures spot information, the destination spot information and the transition spot information, and the route calculation condition information, on the basis of the route calculation request command acquired via the line connecting the communication unit 12 and the center communication unit 21. And the drive route information based on the calculated drive route and the map information around the peripheral district including its route are read from the storage unit 23, and transmitted via the line to the vehicle mounted terminal 10 at the same time.

At the vehicle mounted terminal 10, a map with the drive route superposed is displayed on the display unit 11, based on the drive route information that the communication unit 12 acquires via the line and the map information around the peripheral district including its route. This drive route information and the map information around the peripheral district including its route are stored and held in the temporary storage unit 17 within the control part 13.

The retrieval request command for the facility or spot will be detailed below. At the vehicle mounted terminal 10, a plurality of screens for enabling the user to input the retrieval information as the conditions for retrieving the facility or spot are switched and displayed in succession on the display unit 11 in accordance with a user's operation under the control of the control unit 13.

The control unit 13 outputs the input retrieval information to the data processing part 15, whereby the retrieval information is converted into a predetermined format in the data processing part 15, and transmitted as a retrieval request command for facility or spot via the transmitting and receiving component 16 to the information center 20.

Typical examples of the retrieval information include the address, zip code, telephone number, facility name and facility type.

In the information center 20, in response to the retrieval request command acquired via the line connecting the communication unit 12 and the center communication unit 21, the center control unit 22 reads the detailed information of the spot or facility matched with the retrieval information included in the retrieval request command, and the map information containing the relevant spot or facility from the storage unit 23, and transmits the read information via the line to the vehicle mounted terminal 10.

At the vehicle mounted terminal 10, the detailed information is displayed on the display unit 11, based on the detailed information of the stop or facility acquired via the line by the communication unit 12, and when the user inputs a map display command, a map with a mark indicating the existent location of the spot or facility superposed is displayed on the display unit 11, based on the map information acquired with the detailed information of the facility. This detailed information is stored and held in the temporary storage unit 17 within the control part 13.

In this way, in the communication terminal unit employed for the navigation system for transmitting or receiving various kinds of commands or information via the line connecting the communication unit 12 and the center communication unit 21, the control unit 13 that functions as a connection control unit for controlling the line connection of the communication unit 12 starts the connection with the information center 20 in advance to-make the line connected, when the display on the display unit 11 transfers to the predetermined display contents. That is, when the portable telephone service system or the PHS telephone service system is employed, the vehicle mounted terminal 10 and the information center 20 are placed in a service state.

After the line connection process is started, a screen for deciding the departure spot and the destination spot or a screen for inputting the conditions for retrieving the spot or facility the user is displayed to enable the user to enter various information.

At the time when the input of each information is completed by the user at the vehicle mounted terminal 10, the line connecting the communication unit 12 and the center communication unit 21 is already established, whereby each information input at the vehicle mounted terminal 10 is quickly transmitted to the information center 20.

Therefore, the timing of starting the transmission of the information to the information center 20 takes place drastically earlier than when starting the line connection after inputting the information to be transmitted at the vehicle mounted terminal 10, and the acquisition rate of the information from the information center 20 is increased, whereby it is possible to proceed with the operation at excellent responses without making aware of the connection state of the communication unit.

EXAMPLE

Referring to FIGS. 2A to 2F, an example is given below.

FIGS. 2A to 2F show a transition of the display contents on the display unit 11 at the vehicle mounted terminal 10 mounted on the vehicle. The transition of the display contents is implemented under the control of the control unit 13 that functions as the display control unit.

Figure 2A:
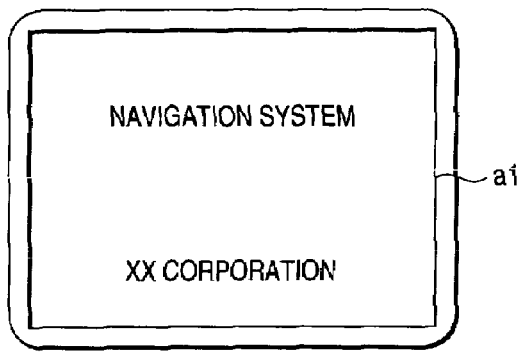
FIGS. 2A to 2F are views showing the display contents of a display unit in an example of the invention.

If the user presses a power button contained in the operation unit 18 constituting the vehicle mounted terminal 10, the vehicle mounted terminal 10 is initiated, so that an initial screen a1 appears on the display unit 11, as shown in FIG. 2A, informing the user that the vehicle mounted terminal 10 is initiated.

Figure 2D:
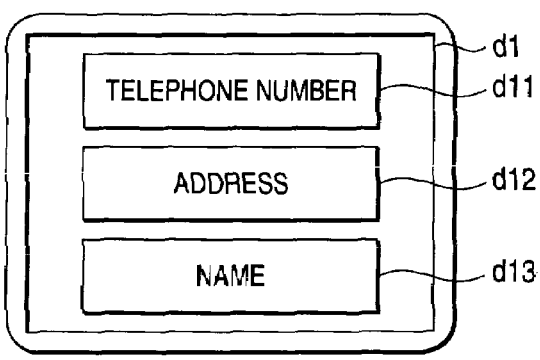
Figure 2B:
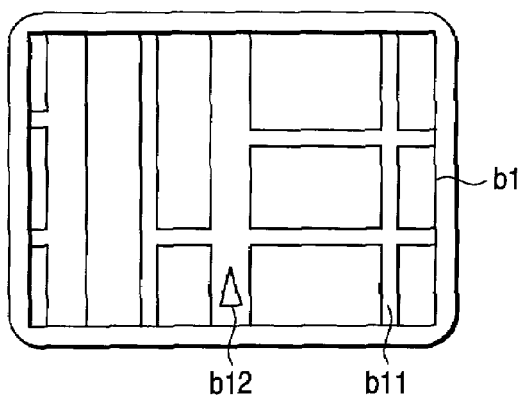

If this initial screen is displayed for a certain period of time, the screen transfers to a basic screen b1 as shown in FIG. 2B. The display contents in this basic screen b1 include a map image b11 for representing the road or the form of facility and a current location mark b12 indicating the current location of the self vehicle. On this basic screen, the map image b11 is scrolled within the screen, as the current location of the self vehicle changes.

Figure 2E:
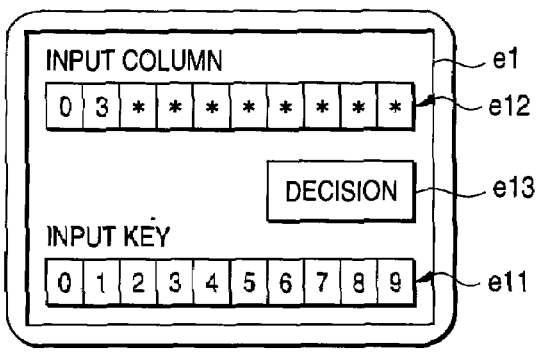
Figure 2C:
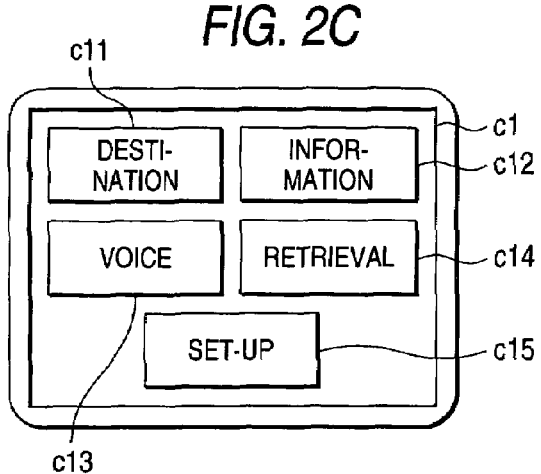

In this state, if the user operates a menu button in the operation unit 18 to make an operation on the vehicle mounted terminal 10, the screen transfers to a menu screen c1 as shown in FIG. 2C. The display contents in the menu screen c1 include "destination spot" icon c11, "information" icon c12, "voice" icon c13, "retrieval" icon c14, and "setting" icon c15 as the icons indicating various kinds of operation items. When it is desired to return to a previous screen before transfer, a "return" button provided in the operation unit 18 is operated to return to one previous screen.

At the time when the menu button is operated, the control unit 13 controls the communication unit 12 to start a process for making the line connection with the information center 20.

When the menu screen c1 is displayed, the user makes an operation for designating an icon corresponding to a desired operation. Upon this operation, the screen of the display unit 11 transfers to the next display screen. In the following description of this example, an operation process in which the user inputs the telephone number to decide the place of destination and confirms and decides the destination spot will be described.

If the user designates the "destination" icon c11 on the menu screen c1, the screen transfers to a retrieval condition specification screen d1 as shown in FIG. 2D. The display contents of the retrieval condition specification screen include a "telephone number" icon d11, an "address" icon d12, and a "name" icon d13 as the icons indicating various kinds of condition items.

If the user designates the "telephone number" icon d11 on the retrieval condition specification screen d1, the screen transfers to an information input screen e1 as shown in FIG. 2E. The display contents of the information input screen e1 include a "digit ten-key group" icon e11 for entering the digits of telephone number for retrieval successively, a display area e12 for displaying the digits specified successively in accordance with a designating operation of the "digit ten-key group" icon e11, and a "decision" icon e13 that is operated when the input of telephone number for retrieval is ended.

If the input of telephone number to be retrieved is ended on the information input screen e1, the user makes an operation for designating the "decision" icon e13. At the time when this operation is performed, a retrieval request command is transmitted from the vehicle mounted terminal 10 to the information center 20 with the input telephone number as the retrieval information. At this time, since the line connecting the vehicle mounted terminal 10 and the information center 20 is established, the retrieval request command is immediately transmitted to the information center 20.

Figure 2F:
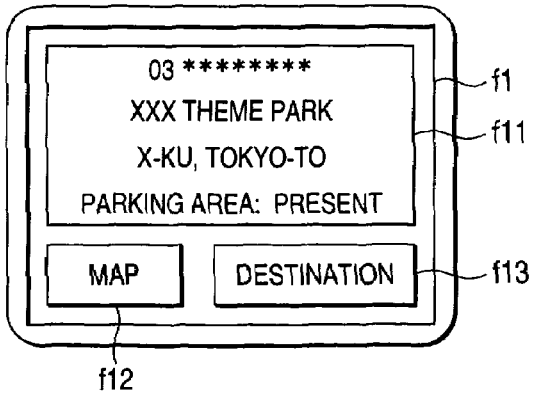

Subsequently, the detailed information is transmitted from the information center 20 in response to the retrieval request command, whereby an acquired information display screen f1 as shown in FIG. 2F is displayed on the display unit 11 at the vehicle mounted terminal 10. The display contents of the acquired information display screen f1 include the detailed information f11 corresponding to the telephone number, which is transmitted from the information center 20, a "map" icon f12 for displaying the spot or location of facility corresponding to the detailed information as a map, and a "destination" icon f13 for setting the spot or location of facility corresponding to the detailed information as the place of destination.

If the user designates the "map" icon f12 on the acquired information display screen f1, a map with a mark indication the spot or existent location of facility superposed is displayed on the display unit 11, on the basis of the map information transmitted with the detailed information from the information center 20.

Also, on the acquired information display screen f1, if the user designates the "decision" icon f13, the spot or facility corresponding to its detailed information is decided as the place of destination, and along with this, the information including the spot as the destination spot information, and the current location as the departure spot information, together with the route calculation condition information separately decided, is transmitted as a route calculation request command to the information center 20.

In this example, the control unit 13 controls the communication unit 12, and the timing for starting a process for making the line connection with the information center 20 takes place when the menu button of the operation unit 18 is clicked to display the menu screen c1, but this invention is not limited to such a timing. This timing may take place when the menu screen c1 is displayed and an operation for designating the icon representing the operation item on the screen is conducted.

Also, the timing may take place when the user makes an operation for designating the icon representing various kinds of condition item displayed on the retrieval condition specification screen d1.

That is, at a stage before transferring to the input screen (e.g., information input screen e1 as shown in FIG. 2E) for inputting the information to be transmitted to the information center 20, the control unit 13 controls the communication unit 12 to start the process for making the line connection with the information center 20 in advance, whereby the information is transmitted to the information center 20 at once when the user finishes to input the information to be transmitted to the information center 20.

The screen displayed at the timing when the control unit 13 controls the communication unit 12 to start the process for making the line connection with the information center 20 may be predetermined, or may be automatically set by the unit as the connection start screen in accordance with the receiving sensitivity of the portable telephone or PHS. In this case, at a low receiving sensitivity, the timing may take place when the screen closer to the basic screen b1 is displayed, whereby there is a higher probability that the connection is completed before performing the operation for transmitting the information to the information center 20.

On the other hand, at a good receiving sensitivity, when the information input screen e1 is displayed, or when the screen closer to the information input screen e1 is displayed, the connection is completed before performing the operation for transmitting the information to the information center 20, in which the connection time is shortened and the communication cost is reduced.

Also, in the case where the control unit 13 controls the communication unit 12 to start the process for making the line connection with the information center 20 when the menu screen c1 is displayed, a process for interrupting the line connection may be started in accordance with the content of icon indicating the operation item to be designated later.

That is, in the case where it is not required to transmit or receive the information to or from the information center 20, for example, when the system set-up content of the vehicle mounted terminal 10 is simply changed by conducting an operation for designating the "set-up" icon c15, the process for interrupting the line connection may be started during the set-up operation because there is no need for connecting the line with the information center 20, whereby the communication cost is suppressed.

In the embodiment and example as described above, the communication terminal unit is mounted on the vehicle. However, this invention is also applicable to the portable telephone terminal having the positioning unit mounted or the system using the terminal unit having the positioning unit mounted.

In the embodiment and example as described above, the computer program is provided to enable the computer to perform the same functions.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A communication terminal, comprising:
    a communication circuit that transmits information to an information center and that receives information from the information center, wherein the information center is remote from the communication terminal; and
    a controller that, in response to a predetermined event, instructs the communication circuit to begin to establish a communication line with the information center to create a communication session between the communication terminal and the information center,
    wherein the predetermined event occurs before a user instructs the controller to instruct the communication circuit to transmit initial data to the information center, and
    wherein the communication circuit transmits the initial data to the information center before the communication circuit transmits any other data to the information center in response to a user instruction during the communication session.

2. The communication terminal as claimed in claim 1, further comprising:
    a display, wherein the predetermined event comprises displaying a predetermined screen on the display.

3. The communication terminal as claimed in claim 1, further comprising:
    an user input unit, wherein the predetermined event comprises the user inputting a predetermined command via the user input unit.

4. The communication terminal as claimed in claim 1, further comprising:
    an key input unit, wherein the predetermined event comprises the user activating a predetermined button on the key input unit.

5. The communication terminal as claimed in claim 1, wherein the initial data comprises a request that requests information from the information center.

6. The communication terminal as claimed in claim 1, wherein the initial data comprises a request to download information from the information center to convey to the user.

7. The communication terminal as claimed in claim 6, wherein the any other data comprises a request to download information from the information center to convey to the user.

8. A communication method, comprising:
    transmitting information to a remote information center;
    receiving information from the information center; and
    in response to a predetermined event, begin establishing a communication line with the information center to create a communication session with the information center,
    wherein the predetermined event occurs before a user instruction to transmit initial data to the information center, and
    transmitting the initial data to the information center before transmitting any other data to the information center in response to a user instruction during the communication session.

9. The method as claimed in claim 8, wherein the initial data comprises a request to download information from the information center to convey to a user.

10. The method as claimed in claim 9, wherein the any other data comprises a request to download information from the information center to convey to the user.

11. A computer-readable medium tangibly containing a software program that instructs a computer to perform a routine, comprising:
    transmitting information to a remote information center;
    receiving information from the information center; and
    in response to a predetermined event, begin establishing a communication line with the information center to create a communication session with the information center,
    wherein the predetermined event occurs before a user instruction to transmit initial data to the information center, and
    transmitting the initial data to the information center before transmitting any other data to the information center in response to a user instruction during the communication session.

12. The software program as claimed in claim 11, wherein the initial data comprises a request to download information from the information center to convey to a user.

13. The software program as claimed in claim 12, wherein the any other data comprises a request to download information from the information center to convey to the user.

* * * * *